United States Patent
Zemmouri et al.

(10) Patent No.: US 7,233,608 B2
(45) Date of Patent: Jun. 19, 2007

(54) FREQUENCY-STABILIZED LASER SOURCE ADAPTED FOR USE AS A FREQUENCY STANDARD, IN PARTICULAR IN THE FIELD OF TELECOMMUNICATIONS

(75) Inventors: Jaouad Zemmouri, Hem (FR); Igor Razdobreev, Faches-Thumesnti (FR); Jean Ringot, Mons-en-Baroeul (FR)

(73) Assignee: Universite des Sciences et Technologies de Lille, Villenueuve d'Ascq (FR)

( * ) Notice: Subject to any disclaimer, the term of this patent is extended or adjusted under 35 U.S.C. 154(b) by 353 days.

(21) Appl. No.: 10/481,177

(22) PCT Filed: Jun. 18, 2002

(86) PCT No.: PCT/FR02/02094

§ 371 (c)(1),
(2), (4) Date: Jan. 29, 2004

(87) PCT Pub. No.: WO02/103861

PCT Pub. Date: Dec. 27, 2002

(65) Prior Publication Data

US 2004/0213304 A1    Oct. 28, 2004

(30) Foreign Application Priority Data

Jun. 18, 2001   (FR) .................................. 01 07974

(51) Int. Cl.
*H01S 3/13* (2006.01)
(52) U.S. Cl. ....................... 372/32; 372/29.02
(58) Field of Classification Search ........ 372/29.02–32
See application file for complete search history.

(56) References Cited

U.S. PATENT DOCUMENTS

| | | | | |
|---|---|---|---|---|
| 3,471,804 A | * | 10/1969 | Bridges et al. ............... | 372/32 |
| 3,584,312 A | * | 6/1971 | Statz .......................... | 372/32 |
| 3,594,659 A | * | 7/1971 | Brandli et al. ............... | 372/32 |
| 3,596,201 A | * | 7/1971 | Chester ....................... | 372/32 |
| 3,686,585 A | * | 8/1972 | Javan et al. .................. | 372/32 |
| 3,899,748 A | * | 8/1975 | Bodlaj ......................... | 372/32 |
| 3,976,957 A | * | 8/1976 | Le Floch et al. ............. | 372/32 |
| 4,025,875 A | * | 5/1977 | Fletcher et al. .............. | 372/30 |
| 4,592,058 A | * | 5/1986 | Mongeon et al. ............. | 372/32 |
| 4,833,681 A | * | 5/1989 | Akiyama et al. ............. | 372/32 |

(Continued)

OTHER PUBLICATIONS

Itoh, T. et al: "Q-Switching and mode selection of coupled-cavity ER, YB: glass lasers," Japanese Journal of Applied Physics, Publication Office Japanese Journal of Applied Physics. Tokyo, JP, vol. 36, No. 2B, Feb. 15, 1997, pp. L206-L208.

(Continued)

*Primary Examiner*—Minsun Oh Harvery
*Assistant Examiner*—Philip Nguyen
(74) *Attorney, Agent, or Firm*—Weingarten, Schurgin, Gagnebin & Lebovici LLP (57) ABSTRACT

A frequency-stabilized laser source that is adapted for use as a frequency standard. The frequency of the laser source is locked and the laser beam delivered by the laser source on a transition of an absorber chemical element. The technique combines both operation with saturated absorption and synchronous detection, based on modulating said transition being saturated by the beam passing through the absorber chemical element. This produces a single frequency laser beam whose output frequency is stationary. The frequency is not continuously modulated and is more precise than that which would be obtained operating with single-pass absorption only. The laser source is thus adapted for making a frequency standard.

20 Claims, 4 Drawing Sheets

U.S. PATENT DOCUMENTS

| | | | | |
|---|---|---|---|---|
| 4,893,353 A | * | 1/1990 | Iwaoka et al. | 398/183 |
| 5,063,568 A | | 11/1991 | Chiba et al. | |
| 5,068,864 A | * | 11/1991 | Javan | 372/32 |
| 5,553,087 A | * | 9/1996 | Telle | 372/32 |
| 5,905,748 A | * | 5/1999 | Xie | 372/22 |
| 5,969,825 A | * | 10/1999 | Bomse et al. | 356/437 |
| 5,982,802 A | * | 11/1999 | Thony et al. | 372/75 |
| 6,351,309 B1 | * | 2/2002 | Bomse et al. | 356/437 |
| 6,477,189 B1 | * | 11/2002 | Takeda et al. | 372/32 |
| 6,654,394 B1 | * | 11/2003 | Sellin et al. | 372/32 |

OTHER PUBLICATIONS

Svelto, C., et al.: "Frequency stabilization of a novel 1.5- mu m Er-Yb bulk laser to a /sup 39/k sub-Doppler line at 770.1 nm", IEEE Journal of Quantum Electronics, Apr. 2001, IEEE, USA, vol. 37, No. 4, pp. 505-510.

Vered, Mahal et al: "Quasi-phase-matched frequency doubling in a waveguide of a 1560-nm diode laser and locking to the rubidium D2 absorption lines," Optics Letters, Optical Society of America, Washington, US, vol. 21, No. 16, Aug. 15, 1996, pp. 1217-1219.

Foreign Search Report dated Oct. 14, 2002.

* cited by examiner

FREQUENCY-STABILIZED LASER SOURCE ADAPTED FOR USE AS A FREQUENCY STANDARD, IN PARTICULAR IN THE FIELD OF TELECOMMUNICATIONS

This application is a 371 national phase filing of PCT/FR02/02094 filed Jun. 18, 2002, and claims priority to a French application No. 01 07974 filed Jun. 18, 2001.

FIELD AND BACKGROUND

The present invention relates to a frequency-stabilized laser source using a solid state laser adapted to be used as a frequency standard, in particular in the field of telecommunications.

The very rapid expansion of local telecommunications networks of the local area network (LAN) type, and of greater-distance telecommunications networks of the wide area network (WAN) type is leading to an ever-increasing requirement for bandwidth. In order to satisfy this requirement for bandwidth in telecommunications networks, one technique that is commonly implemented at present lies in developing networks that are wavelength division multiplexed (WDM). With such wavelength division multiplexing, a plurality of signals (or channels) are transported simultaneously in a single optical fiber, but at different wavelengths.

Multichannel light transmission (WDM) raises two major difficulties. The first lies in creating and extracting each channel at reasonable cost without losing information. The second difficulty is associated with optically amplifying all of the channels without distortion and/or loss of information. These difficulties increase with an increase in the number of channels used.

A first technique commonly implemented for selecting channels (multiplexing or demultiplexing) is a passive frequency-filtering method based on using Bragg gratings. At present, although Bragg grating technology is quite well mastered, and of reasonable cost, certain physical limitations (long-term stability in Bragg wavelength, sensitivity to external media, in particular temperature, . . . ) are leading to several problems, particularly when channel density becomes high.

A second technique that can be used for avoiding problems associated with using Bragg gratings is a method in which information is processed actively, based on heterodyne detection. However, implementing that method to discriminate precisely between channels requires frequency standards to be available in the form of longitudinal monomode laser sources having very high spectral purity, small size, and suitable for being integrated in telecommunications racks, which sources must be accurately stabilized in frequency, must emit at frequencies that are known with precision, and must be located on the various different sites of the telecommunications network (both for transmission and for reception). In practice, given the wavelengths presently used in the field of telecommunications, these standard laser sources must enable a coherent light beam to be emitted at a wavelength of 1.56 micrometers ($\mu$m). The greater the precision of the standard source, the closer the wavelengths of the various channels can be to one another, thus making it possible to increase overall bandwidth significantly.

At present, in the field of telecommunications by optical fibers, the laser sources most commonly used use a laser of the semiconductor type as means for emitting the light beam, and more particularly they use a laser diode. A very wide range of laser diodes can be found on the market. The advantages of such diodes are their simplicity of use and their compactness. In contrast, a drawback of such laser diodes is the poor definition of their emission wavelength (wavelength fluctuates over time under the influence of external parameters such as temperature, mechanical deformation, aging, . . . ).

Proposals have also recently been made for a laser source to be provided using a solid state erbium-ytterbium laser stabilized in frequency at about 1.5 $\mu$m. That laser source is described in the article entitled:

"Frequency stabilization of a novel 1.5 Er-Yb bulk laser to a $^{39}$K sub-Doppler line at 770.1 nm" by Sveltco et al., published in IEEE Journal of Quantum Electronics, April 2001, IEEE, USA, Vol. 37, No. 4, pp. 505–510.

Frequency stabilization of the laser source as described in that article is implemented by locking the frequency of the laser beam on a transition T of an absorber chemical element (specifically rubidium). More precisely, it is recommended to perform such lock by implementing synchronous detection based on frequency modulation of the laser beam delivered by the solid state laser (see paragraph V.: "Wavelength-modulation spectroscopy and frequency-locking experiment"). As a result, the frequency of the laser beam delivered by the solid state laser oscillates continuously and is therefore not accurately stationary. Although the laser source described is indeed frequency stabilized, it is nevertheless not adapted to constituting a frequency standard because of the continuous fluctuation in its frequency.

In the field of solid state lasers, the main object of the present invention is to propose a novel frequency-stabilized laser source that is adapted for use as a frequency standard.

Another object of the invention is to propose a novel frequency-stabilized laser source that is adapted for use as a frequency standard in the field of telecommunications.

Another object of the invention is to propose a novel frequency-stabilized laser source that enables transverse monomode radiation to be emitted so as to facilitate coupling the electromagnetic waves with optical fibers and planar waveguides.

Another object of the invention is to propose a novel frequency-stabilized laser source that enables longitudinal monomode radiation to be emitted and good spectral fineness to be obtained.

The solution of the invention consists in providing a laser source that combines the technical characteristics of claim 1. The solution of the invention is thus based on locking the frequency of the laser beam delivered by a solid state laser on a transition of an absorber chemical element, which lock advantageously combines both operation with saturated absorption (said transition being saturated by the beam passing through the absorber chemical element) and synchronous detection based on modulating said saturated transition. This produces a single frequency laser beam whose output frequency is stationary compared with that of the above-mentioned laser source of Sveltco et al., i.e. its frequency is not continuously modulated, and its frequency is much more precise than that which would be obtained operating with single-pass absorption only. The laser source is thus perfectly adapted for making a frequency standard.

DESCRIPTION OF THE DRAWINGS

Other characteristics and advantages of the invention will appear more clearly on reading the following description of two variant embodiments of the invention, which description is given by way of non-limiting example and with reference to the accompanying drawings, in which.

DETAILED DESCRIPTION

Figure 1:
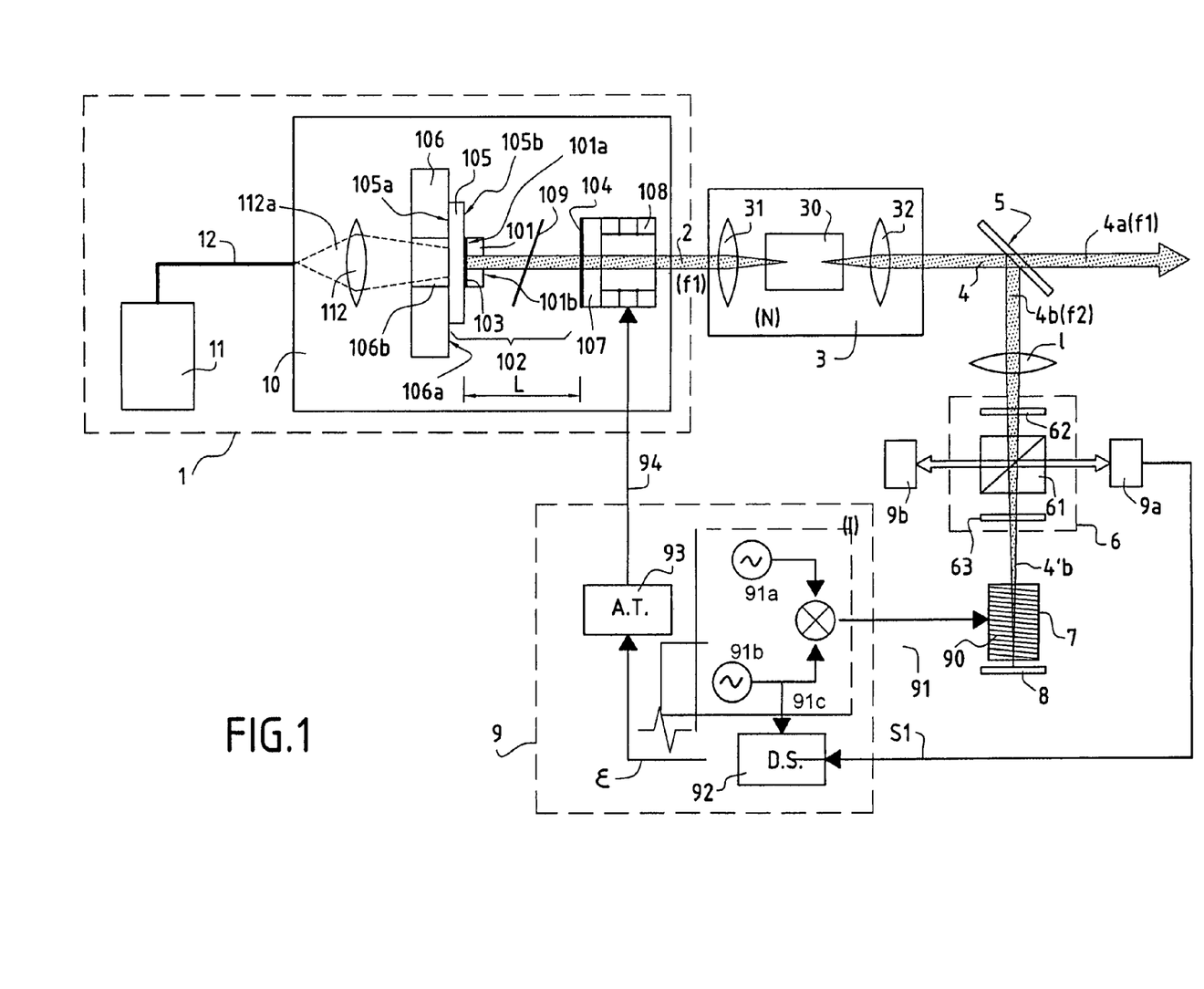
FIG. 1 is a diagram of a first embodiment of a laser source of the invention.

With reference to FIG. 1, and in a first embodiment of the invention, the laser source comprises:

an assembly 1 formed by a polarized miniature laser 10 optically pumped by a pump diode 11 via a short optical fiber 12, and outputting a first laser beam 2 of frequency f1;

an $N^{th}$ harmonic generator 3 serving to respond to said first laser beam 2 by generating a light beam 4 made up of a second laser beam 4a having the same frequency f1 and a second laser beam 4b referred to as an $N^{th}$ harmonic whose frequency f2 is equal to N times the frequency f1 of the laser beam 2 (where N is an integer greater than or equal to 2);

an absorption cell 7 containing an absorber chemical element, which in the particular element described below is a gas (or a vapor) of rubidium (Rb);

a dichroic mirror 5 (or any other equivalent known optical means performing the same function) which in general serves to separate the above-mentioned beams 4a and 4b, allowing the second laser beam 4a of frequency f1 to pass and form the output laser beam, while deflecting the light beam 4b ($N^{th}$ harmonic) so as to direct it towards the absorption cell 7 so as to make it pass through the absorber chemical element in said cell 7;

laser beam polarizing means 6 interposed between the absorber cell 7 and the dichroic mirror 5;

a focusing lens $\ell$ interposed between the dichroic mirror 5 and the polarizing means 6; this lens $\ell$ serves to reduce the size of the beam 4b and thereby increase its power density; the use of this lens is not necessary when the beam 4b presents sufficient power;

a mirror 8 (or any other equivalent reflecting optical means performing the same function) serving to return (deflect through 180°) the light beam 4"b coming from the absorption cell 7 back towards said absorption cell so as to cause it to pass through the absorption cell a second time along the same optical path, thereby enabling operation to take place with absorption that is saturated; and locking means 9 which are designed to lock the frequency f1 of the first beam 2 accurately on a transition of the absorber chemical element (rubidium).

The solid state laser 10 and the generator 3 are designed in such a manner that the power of the $N^{th}$ harmonic output by the generator 3 is sufficient to obtain saturation of said transition of the absorber chemical element, i.e. saturation of absorption by the rubidium in this particular example which is described below in greater detail.

Assembly 1: Solid State Laser 10—Optical Fiber 11—Pump Diode 12

The solid state laser 10 comprises an active material element 101 designed to be pumped optically, and presented more particularly in the form of a very thin glass bar (about 1 mm thick, that being the long dimension of the cavity), which bar is co-doped with ytterbium and erbium. When pumped optically at a pumping wavelength $\lambda_p$ of about 975 nanometers (nm), erbium ions inserted in a vitreous matrix serve to cause the glass bar 101 to perform laser emission at a wavelength $\lambda$ lying in the spectrum band 1.5 µm to 1.6 µm.

Nevertheless, the invention is not limited to using a bar of glass co-doped with ytterbium and erbium, and more generally the solid state laser can be made from a piece of doped active material. In particular it may be constituted by a crystal (instead of a vitreous matrix), and more particularly it can be semiconductive.

The bar 101 is positioned in a laser cavity 102 forming a Fabry-Perrot interferometer. The bar 101 has two opposite plane faces 101a and 101b which are parallel and oriented perpendicularly to the longitudinal axis of the cavity 101. The cavity 102 is defined by two mirrors 103, 104. According to a preferred characteristic, the entry mirror is a dichroic mirror. In addition, in order to reduce size, the entry mirror 103 is disposed directly on the face 101a of the bar 101 and forms a plane mirror.

Opposite from the entry mirror 103, the exit mirror 104 is a plane mirror such that the cavity 102 is a plane-plane type cavity. The length L of the cavity 102, which corresponds to the distance between the two mirrors 103 and 104 along the longitudinal optical axis of the cavity, is capable of fine adjustment so as to enable the length of the cavity to be adjusted, thereby enabling the emission frequency f1 of the solid state laser 1 to be adjusted. This fine adjustment is obtained using a piezoelectric spacer 108 having the exit mirror 104 mounted thereon, preferably (but not necessarily) via a coupler element 107 (e.g. a glass substrate), and by acting on the control voltage applied to the piezoelectric spacer 108. The control voltage is controlled automatically by a feedback loop described below, and serves in general to lock the emission wavelength $\lambda 1$ ($\lambda 1 = c/f1$, where c is the speed of light) of the solid state laser 10 on a transition of the absorber chemical element of the cell 7 (where said transition is referenced generally below as T), which chemical element is selected in such a manner that this emission wavelength $\lambda 1$ is stabilized around 1.56 µm.

The use of a plane-plane type cavity 102 that is short in length serves advantageously to obtain radiation at the output from the solid state laser 10 in transverse and longitudinal monomode regimes of very good quality.

The assembly comprising the entry mirror 103 and the bar 101 forms the entry face of the cavity 102 and is mounted for cooling purposes on a first face 105a of a sapphire window 105. The sapphire window 105 which is in contact with the entry mirror 103 serves to dissipate the heat energy that accumulates in the glass bar 101 during operation of the solid state laser 10. This sapphire window could be replaced in another embodiment by any element made of a material which is transparent for the pump beam from the pump diode 11 and which presents a coefficient of thermal conductivity greater than that of the bar 101 so as to dissipate the heat energy generated in the bar 101 during pumping.

The higher the coefficient of thermal conductivity of the window 105, the better the cooling of the bar 101. By way of retaining means, in another embodiment implementing a bar 101 made of glass, with a pump wavelength of about 975 nm, it is possible to replace the sapphire window with a window made of AlN.

The sapphire window is mounted on one of the faces (106a) of a radiator 106 whose center presents a through opening 106b which allows the pump beam to pass to the assembly comprising the sapphire window 105, the mirror 103, and the bar 101, with the second face 105b of the window 105 closing said opening 106b. The radiator 106, which is in contact with the window 105, serves to evacuate to the outside the heat energy which is absorbed by the sapphire window 105 during pumping, and for this purpose it presents a dissipation area that is large (compared with the area of the window 105). By way of example, the radiator 106 is made of copper or of aluminum. It could also be a Peltier element enabling heat energy to be absorbed actively from the window 105.

Implementing the radiator 106 and the window 105 in combination makes it possible advantageously to stabilize the plane-plane cavity 102 by deflective cooling of the assembly comprising the entry mirror 103 and the glass bar 101. If the assembly comprising the entry mirror 103 and the bar 101 is not cooled at all, or if this assembly is not cooled sufficiently, then while the laser is in operation under drive from the pump beam, the assembly comprising the entry mirror 103 and the bar 101 will deform and expand, and will then act like a lens (the thermal lens effect). Such a lens associated with a plane exit mirror 104 then forms a cavity which is unstable and makes the laser inoperative. In addition, ineffective cooling can lead to the bar 101 being destroyed.

Upstream from the assembly comprising the radiator 106, the sapphire window 105, the entry mirror 103, and the glass bar 101, there is mounted a focusing lens 112 which is centered on the optical axis of the cavity.

The solid state laser 1 also comprises in conventional manner a pivotally-mounted etalon 109 (thin plate) which is positioned in the cavity 102, being centered on the optical axis of the cavity and serving to provide coarse adjustment of the emission frequency of the solid state laser 10 by adjusting the initial angular position of the etalon 109.

In order to stabilize the polarization of the radiation output by the solid state laser 10, when the active material (the bar 101) is isotropic, as is the case for glass co-doped with ytterbium and erbium, the etalon 109 is made of a material having polarizing ability, such as, for example, the material sold under the registered trademark "POLARCOR". In contrast, if the active material is anisotropic, then the etalon 109 can be made of a material which is isotropic, e.g. glass.

The pump diode 11 serves to pump the solid state laser optically through the entry mirror 103. In a particular embodiment, a monomode laser diode is used of power less than 1 watt (W). More particularly, for pumping the glass 101 co-doped with ytterbium and erbium, a semiconductor GaInAsP diode is used which enables a pump wavelength $\lambda_p$ to be obtained of about 975 nm.

The use of an active medium made out of glass (or crystal) co-doped with ytterbium and erbium, combined with cooling of the active medium via its entry face (dichroic mirror 103 associated with the window 105 and the dissipation radiator 106), and the use of a plane-plane type cavity 102, makes it possible advantageously and at low cost to obtain a solid state laser 10 which presents small size and which is capable of outputting a laser beam 2 of wavelength $\lambda 1$ ($\lambda 1 = c/f1$) that is adjusted to 1.56 μm, and that presents sufficient power in both the longitudinal and the transverse monomode regimes.

Harmonic Generator (3)

The generator 3 comprises two focusing lenses 31 and 32 having a non-linear crystal 30 based on PP:KTiOPO$_4$ crystals placed between them so as to obtain quasi-phase matching. In general, the PP:KTiOPO$_4$ crystal could be replaced by any equivalent known crystal performing the same function, for example a crystal based on KNbO$_3$. The generator 3 responds to the input first beam 2 to generate at its output a second harmonic (N=2) of frequency f2 that is twice the frequency of the first beam 2, which second harmonic is deflected by a dichroic mirror 5 towards the absorption cell 7 (beam 4b). The use of a PP:KTP type crystal 30 serves advantageously to obtain a second harmonic at a power that is greater than that which would be obtained, for example, by using a monocrystal of the KNbO$_3$ type.

Polarizing Means 6 and Absorption Cell 7

The polarizing means 6 comprise in succession and in alignment on the same optical axis: a half-wave plate 62, a polarizing cube 61, and a quarter-wave plate 63. In operation, the incoming beam 4b of frequency f2 corresponding to the second harmonic generated by the crystal 30 is sent to the polarizing cube 61. The half-wave plate 62 serves to direct a very small fraction of the power of said incoming beam 4b towards a first photodiode 9a. Most of the power of the incoming beam 4b passes a first time through the polarizing cube 61 and then passes through the quarter-wave plate 63. This plate causes the polarization of the beam coming from the polarizing cube 61 to be circular (right or left). The circularly polarized beam 4'b passes through the absorption cell 7 and is reflected through 180° by the mirror 8 so as to pass back through the absorption cell 7 and the quarter-wave plate 63 in succession. Because of its circular polarization, the return beam is reflected by the polarizing cube 61 towards a second photodiode 9b positioned on the side opposite to the first photodiode 9a.

Locking by Saturated Absorption

Figure 3:
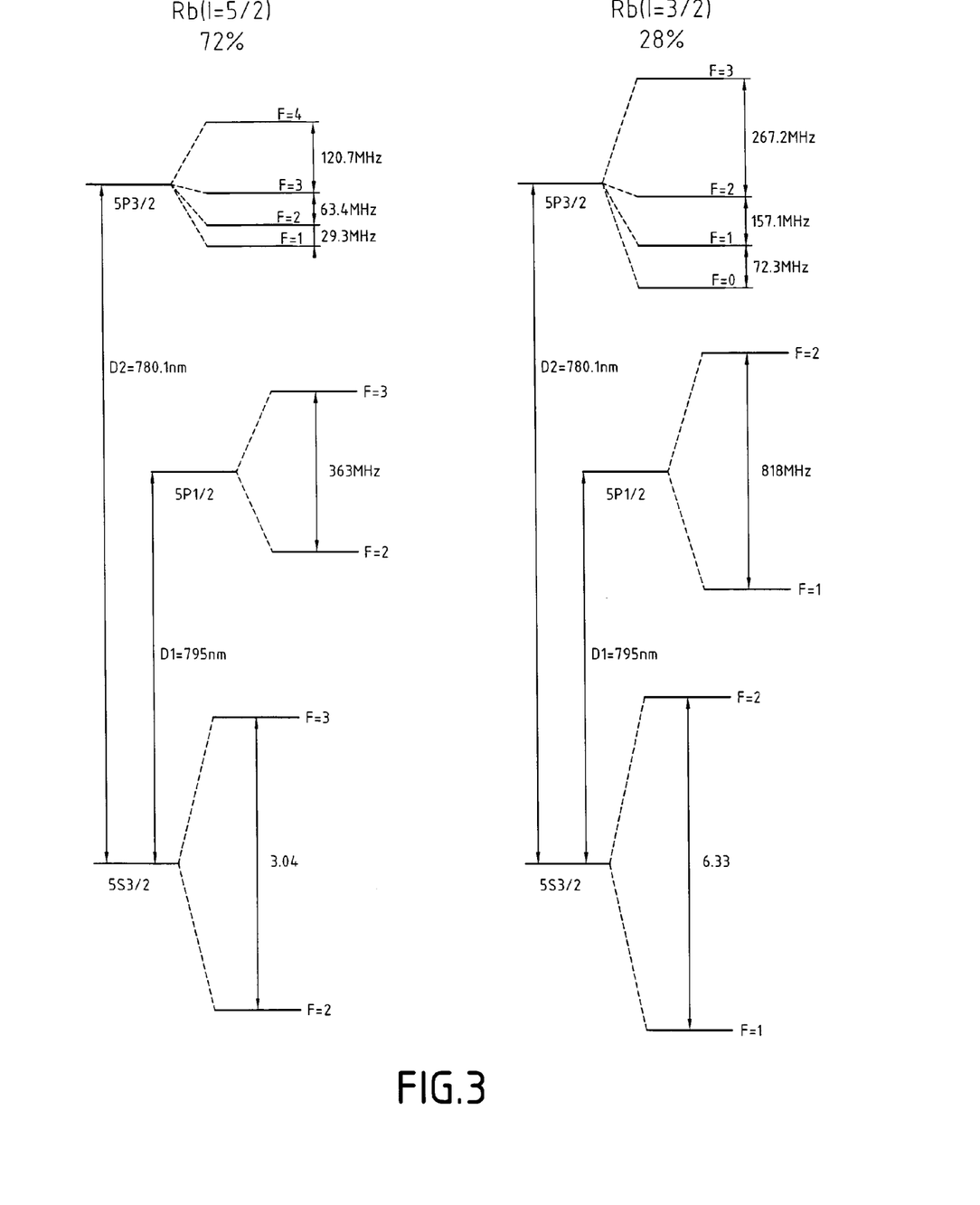
FIG. 3 shows the energy levels of two isotopes (85 and 87) of rubidium (Rb)

FIG. 3 shows the energy levels of rubidium (Rb) 85 and 87. To lock the frequency f1 of the laser beam 2, the transition T used is, for example, the D$_2$ transition (5S$_{1/2}$/F=2→5P$_{3/2}$/F=3) of rubidium (Rb) at 0.7801 μm. This transition D$_2$ couples the 5S$_{1/2}$ (fundamental level) and the 5P$_{3/2}$ (excited level, lifetime 0.15 μs) which advantageously possesses a fine structure. Other atomic transitions of rubidium could also be used for performing lock.

Figure 4:
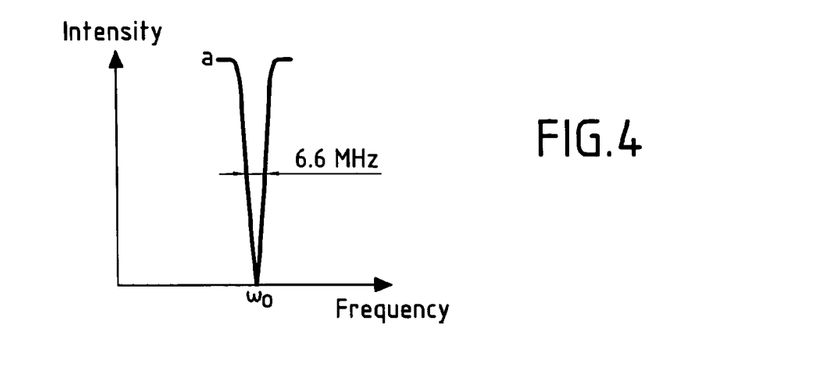
FIG. 4 is a diagram plotting an ideal curve for intensity of the beam that has passed through the absorption cell after a single pass (simple absorption), on the purely theoretical assumption that there is no broadening of the absorption peak by the Doppler effect.
Figure 5:
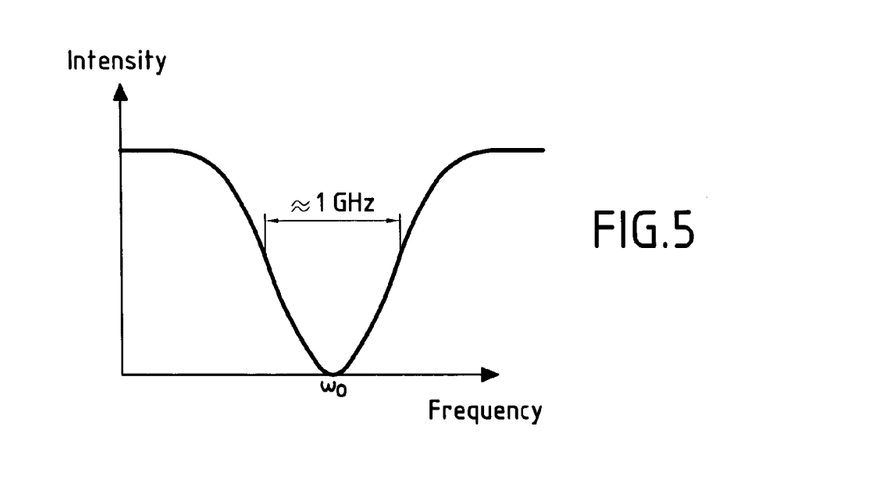
FIG. 5 is a diagram plotting the real curve of the intensity of the beam that has passed once through the absorption cell (simple absorption), showing broadening of the absorption peak by the Doppler effect.

When the angular frequency $w_L$ of the beam 4b passing through the rubidium cell 7 is close to the angular frequency $w_0$ of the selected atomic transition T, the atom absorbs part of the intensity of the beam 4b (see FIG. 4). The amount of energy absorbed is large when the frequency of the beam 4b is within one width of the excited level. The displacement of the atoms in the rubidium gas nevertheless gives rise to a spreading of the width of the transition T due to the Doppler effect. Thus, with single-pass absorption (the beam 4b passing once only through the absorption cell 7), the absorption curve that is obtained in reality is of the type shown in FIG. 5. Thus, with single-pass absorption, the absorption peak (FIG. 5) is too broad in practice to enable lock to be performed that is accurate to within a few MHz.

Saturated absorption makes it possible to mitigate the above problem of broadening of the absorption peak by the Doppler effect. The return beam which is reflected by the mirror 8 in the example of FIG. 1, by passing back through the absorption cell 7, serves to achieve a population inversion, thus making the medium (Rb gas) transparent for atoms at zero speed. Under such circumstances, if the intensity of the beam 4b is sufficient to saturate the transition T, the electrical signal as a function of laser frequency as delivered by the photodiode 9b presents the appearance shown in FIG. 6, which is characterized by a very narrow peak P centered on the angular frequency $w_0$ of the selected atomic transition T. This peak P thus serves advantageously to achieve lock that is much more precise than when using single-pass absorption.

Figure 6:
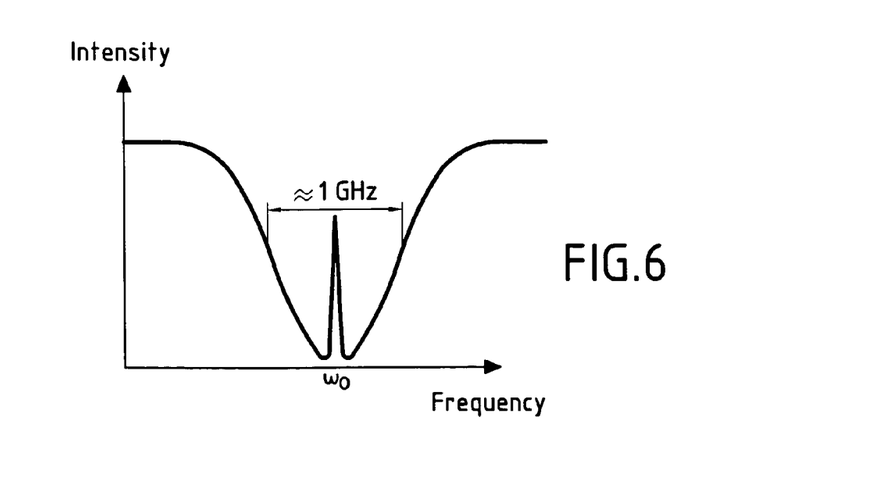
FIG. 6 is a diagram showing the real curve of the intensity of the beam that has passed through the absorption cell after two successive passes with saturation of the atomic transition used for lock.

It will be understood in the light of the above explanation that in order to obtain saturated absorption operation it is important for the power of the $N^{th}$ harmonic (second harmonic, beam 4b in the example of FIG. 1) that is used for locking purposes should be sufficient to saturate the selected transition and to obtain a signal from the photodetector 9b that is as shown in FIG. 6.

Locking Means 9 and Modulation of the Atomic Transition

The locking means 9 enable the frequency of the laser beam 2 to be locked by synchronous detection by modulating the saturated atomic transition T.

These locking means 9 comprise a solenoid 90 surrounding the absorption cell 7, and a feedback loop I. This feedback loop I essentially comprises a sinewave current generator 91a, and oscillator 91b, a synchronous detector module 92, and a voltage amplifier 93.

The sinewave current generator 91a delivers sinewave current of predetermined frequency fp which feeds the solenoid 90. The frequency of this current is fixed by the oscillator 91b (signal 91c), and for example is of the order of several tens of kilohertz (kHz). In operation, the absorption cell is thus subjected to an amplitude-modulated magnetic field created by the solenoid 90. This modulated magnetic field serves to shift the Zeeman sublevels of the transition T (e.g. the atomic transition $D_2$ for rubidium). To a great extent, this shift is proportional specifically to the value of the magnetic field generated. As a result, the absorption signal S1 (as delivered by the photodetector 9a) is continuously frequency modulated over a very narrow range (typically for shifting the energy levels over a few MHz).

The absorption signal S1 is processed by the synchronous detector module 92. This module 92 also receives as an input the signal 91c of frequency fp delivered by the oscillator 91b, and serves in conventional manner to extract an error signal ε from the absorption signal S1, the error signal being in the form of a DC voltage of value proportional to the frequency offset between the frequency of the beam 4b passing through the absorption cell 7 and the selected transition frequency T. The error signal ε is amplified by a voltage amplifier 93 which delivers a control signal 94 (a DC voltage) to the piezoelectric spacer 108. This control signal 94 serves to adjust the length of the solid state laser cavity continuously and in fine manner (i.e. to adjust the distance between the entry and exit mirrors 103 and 104), thereby adjusting the emission frequency f1 of the solid state laser 10.

The laser source of the invention, a particular embodiment of which is described with reference to FIG. 1, serves advantageously to provide a frequency standard which presents the following characteristics and advantages:

emission of transverse monomode radiation (beam 4a), thus facilitating coupling of the electromagnetic wave with optical fibers and planar waveguides;

emission of longitudinal monomode radiation (beam 4a) thus enabling good spectral fineness to be obtained;

very good frequency stability and power stability of the output beam 4a;

emission frequency f1 known absolutely, thus making it possible to use the beam 4a in active multiplexing/demultiplexing techniques;

emission wavelength λ1 stabilized around 1.56 µm, thus enabling it to be used as a frequency standard in the field of telecommunications; and the laser source is compact and small in size, thus making it easy to insert in on-board systems and in processing systems in the field of telecommunications.

As an indication, in an embodiment as shown in the example of above-described FIG. 1, the solid state laser 10 was designed so that the laser beam 2 generated by the solid state laser was stabilized around 1.56 µm with precision of $\pm 10^{-8}$, and presented output power (power of the beam 4a) greater than or equal to 50 milliwatts (mW) in the transverse and longitudinal monomode regimes, which power could be raised to 100 mW. The length L of the cavity was about 5 mm. The length, width, and height of the solid state laser 10 were respectively 50 mm, 30 mm, and 30 mm. The laser beam 2 output by the solid state laser 10 presented very good transverse quality and as a result it was easy to couple with an optical fiber. In particular, the parameter $M^2$ which defines the transverse quality of the beam was less than 1.1. The second harmonic (beam 4b) generated by the generator 3 from the laser beam 2 presented power greater than 1 microwatt (µW), which was sufficient for saturating the $5S_{1/2}/F=2 \rightarrow$ to $5P_{3/2}/F=3$ transition of the rubidium of the absorption cell 7.

Figure 2:
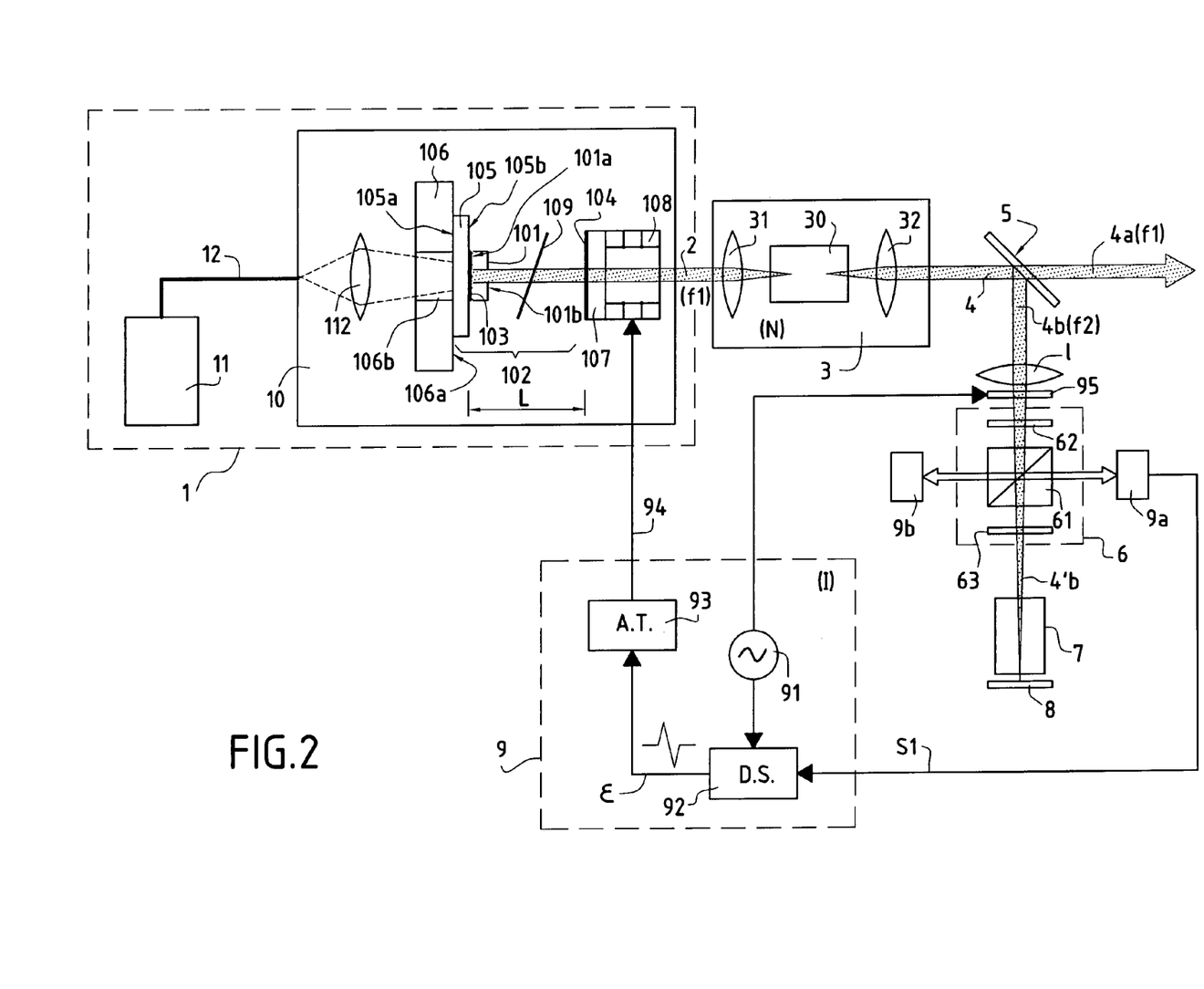
FIG. 2 is a diagram of a second embodiment of a laser source of the invention.

Embodiment of FIG. 2

In this embodiment, the pump diode 11 is not connected to a fiber (unlike the pump diode of FIG. 1 which is coupled at its output to an optical fiber 12), but is coupled directly to the entry mirror 103 of the laser cavity 102 of the solid state laser via focusing optics (lens 112') without using an optical fiber. Likewise, the etalon 109 of the embodiment of FIG. 1 is replaced in the embodiment of FIG. 2 by an etalon plate 109' made of a material which does not have any polarizing ability, such as glass, for example.

The pump diode 11 produces a multimode pump beam 112a which in conventional manner is polarized and presents a profile that is asymmetrical in the plane that extends transversely to the propagation direction of the beam. The asymmetry of this pump beam profile is not modified by the lens 112'. At its output, the solid state laser 10 delivers a laser beam 2 which is polarized, without it being necessary to make use of a polarizing element in the laser cavity 101. The polarization of the laser beam 2 in the embodiment of FIG. 2 can be explained by the combination of two effects:

the asymmetrical distribution in space of the pump beam 112a induces birefringence associated with the thermo-optical effect; and the coupling between the electromagnetic field of the pump beam 112a and that of the radiation produced inside the cavity 102, via non-linear interaction generated within the active material 101.

In comparison, in the embodiment of FIG. 1, the use of the fiber 12 causes the pump beam 112a to be depolarized and symmetrical in the plane extending transversely to the propagation direction of the beam. Because of this spatial symmetry of the pump beam, in order to obtain a laser beam 2 that is polarized at the output of the cavity 102 of the solid state laser, it is necessary to make use of a polarizer element 109 inside said cavity.

As can be seen from the above description, the variant of FIG. 2 is characterized by implementing a pump system (11, 112') designed to produce a pump beam 112a that is polarized, presenting a profile that is asymmetrical in the plane extending transversely to the propagation direction of the beam, the laser beam 2 coming from the cavity 102 being polarized, but without making use of a polarizer element inside the cavity 102. These technical characteristics can advantageously be implemented so as to obtain, in another embodiment, a solid state laser that does not have means (105, 106) for cooling the assembly comprising the entry mirror 103 and the element 101 of active material.

The invention is not limited to the two embodiments described by way of example with reference to FIGS. 1 and 2. In particular, and in non-exhaustive manner, instead of using rubidium, it would be equally possible to use any known alkali metal, and in particular potassium, cesium, hydrogen, sodium, lithium, . . . . More generally, it is possible to use any element or chemical compound that presents distinguished absorption lines adapted to implementing locking as in the embodiments of FIGS. 1 and 2 (modulation of the atomic transition). More generally, the invention can be applied to making a laser source that is stabilized about any predetermined wavelength $\lambda 1$ that could be different from the value 1.56 µm, which at present is a wavelength specific to the field of telecommunications. In the context of the invention, the laser source could be implemented as a solid state laser that is optically pumped which could be different from the particular solid state laser 10 shown in FIG. 1 or FIG. 2, i.e., more generally, by means of a laser implementing in a cavity an element made of an active material that is crystalline or amorphous. Finally, since the solid state lasers 10 described with reference to FIG. 1 and FIG. 2 as preferred embodiments are novel, they can advantageously be used for implementing any type of laser source, and use of them is not necessarily restricted to making a frequency-stabilized laser source of the invention.

The invention claimed is:

1. A frequency-stabilized laser source, characterized in that it comprises an optically-pumped solid state laser enabling a first laser beam to be emitted at frequency f1, an absorption cell containing an absorber chemical element, and which, in operation, has the first laser beam or a beam derived therefrom passing therethrough in such a manner that a transition (T) of the absorber chemical element is saturated, and locking means designed to lock the frequency f1 of the first laser beam on said saturated transition (T) of the absorber chemical element, by means of synchronous detection based on modulating said transition (T), said locking means comprising a solenoid surrounding the absorption cell and powered so as to create an amplitude-modulated magnetic field, said locking means allowing the absorption signal generated by said absorber chemical element to be continuously modulated on the shifting range of the energy sub-levels of said absorber chemical element, such that the so emitted laser beam comprises only one spectral component with a stabilization precision which does not exceed 2 MHz.

2. A laser source according to claim 1, characterized in that it includes optical deflector means enabling the beam that passes through the absorption cell to pass through said absorption cell at least twice in succession.

3. A laser source according to claim 1, characterized in that it includes a generator responsive to the first laser beam delivered by the solid state laser to generate an "$N^{th}$ harmonic" second laser beam of frequency equal to N times the frequency f1 of the first laser beam, where N is an integer greater than or equal to 2, the absorption cell being placed so that said $N^{th}$ harmonic passes therethrough.

4. A laser source according to claim 3, characterized in that the harmonic generator comprises a non-linear crystal based on PP:KTP crystals.

5. A laser source according to claim 1, characterized in that the solid state laser has a cavity which is defined by an entry mirror and an exit mirror, within which there is positioned an element made of active material designed to be pumped optically, and in that the length of the cavity is adjustable by means of an element which is controlled by the locking means.

6. A laser source according to claim 5, characterized in that the element for adjusting the length of the cavity is a piezoelectric spacer.

7. A laser source according to claim 1, characterized in that the solid state laser having a cavity which is defined by an entry mirror and an exit mirror, and in which there is positioned an element of active material that is designed to be optically pumped, the entry mirror of said cavity is placed on one of the faces of said active element and co-operates with the exit mirror to form a plane-plane cavity, and in that the solid state laser includes means for cooling the assembly comprising the entry mirror and the element of active material, which cooling means enable said plane-plane cavity to be made stable.

8. A laser source according to claim 7, characterized in that the cooling means comprise a window in contact with the entry mirror, and made of a material which is transparent to the pump wavelength and which presents thermal conductivity greater than the thermal conductivity of the active element, thereby enabling the heat energy generated in the active material element during pumping to be dissipated.

9. A laser source according to claim 8, characterized in that the window is made of sapphire or of AlN.

10. A laser source according to claim 8, characterized in that the cooling means comprise a radiator which is in contact with the window and which enables the heat energy absorbed by said window during pumping to be evacuated to the outside.

11. A laser source according to claim 1, characterized in that the solid state laser comprises a cavity which is defined by an entry mirror and an exit mirror, and within which there is positioned an element of active material designed to be pumped optically, and a pump system designed to produce a pump beam which is polarized and which presents a profile that is asymmetrical in the plane extending transversely to the propagation direction of the beam, the laser beam coming from the cavity being polarized, without implementing a polarizing element inside the cavity.

12. A laser source according to claim 1, characterized in that the solid state laser comprising an active material element designed to be pumped optically, said active element is a glass or a crystal co-doped with ions of ytterbium and erbium.

13. A laser source according to claim 1, characterized in that the power of the first laser beam is greater than or equal to 50 mW.

14. A laser source according to claim 1, characterized in that the wavelength ($\lambda 1$) of the first laser beam is stabilized around 1.56 µm.

15. A laser source according to claim 1, characterized in that the absorber chemical element is selected from the group: rubidium, potassium, cesium, hydrogen, sodium, lithium.

16. A laser source according to claim 2, characterized in that it includes a generator responsive to the first laser beam delivered by the solid state laser to generate an "$N^{th}$ harmonic" second laser beam of frequency equal to N times the frequency f1 of the first laser beam, where N is an integer greater than or equal to 2, the absorption cell being placed so that said $N^{th}$ harmonic passes therethrough.

17. A laser source according to claim 2, characterized in that the solid state laser has a cavity which is defined by an entry mirror and an exit mirror, within which there is positioned an element made of active material designed to be pumped optically, and in that the length of the cavity is adjustable by means of an element which is controlled by the locking means.

18. A laser source according to claim 3, characterized in that the solid state laser has a cavity which is defined by an entry mirror and an exit mirror, within which there is positioned an element made of active material designed to be pumped optically, and in that the length of the cavity is adjustable by means of an element which is controlled by the locking means.

19. A laser source according to claim 4, characterized in that the solid state laser has a cavity which is defined by an entry mirror and an exit mirror, within which there is positioned an element made of active material designed to be pumped optically, and in that the length of the cavity is adjustable by means of an element which is controlled by the locking means.

20. A laser source according to claim 2, characterized in that:

it includes a generator responsive to the first laser beam delivered by the solid state laser to generate an "$N^{th}$ harmonic" second laser beam of frequency equal to N times the frequency f1 of the first laser beam, where N is an integer greater than or equal to 2, the absorption cell being placed so that said $N^{th}$ harmonic passes therethrough;

the harmonic generator comprises a non-linear crystal based on PP:KTP crystals;

the solid state laser has a cavity which is defined by an entry mirror and an exit mirror, within which there is positioned an element made of active material designed to be pumped optically, and in that the length of the cavity is adjustable by means of an element which is controlled by the locking means;

the element for adjusting the length of the cavity is a piezoelectric spacer;

the solid state laser having a cavity which is defined by an entry mirror and an exit mirror, and in which there is positioned an element of active material that is designed to be optically pumped, the entry mirror of said cavity is placed on one of the faces of said active element and co-operates with the exit mirror to form a plane-plane cavity, and in that the solid state laser includes means for cooling the assembly comprising the entry mirror and the element of active material, which cooling means enable said plane-plane cavity to be made stable;

the cooling means comprise a window in contact with the entry mirror, and made of a material which is transparent to the pump wavelength and which presents thermal conductivity greater than the thermal conductivity of the active element, thereby enabling the heat energy generated in the active material element during pumping to be dissipated;

the window is made of sapphire or of AlN;

the cooling means comprise a radiator which is in contact with the window and which enables the heat energy absorbed by said window during pumping to be evacuated to the outside;

the solid state laser comprises a cavity which is defined by an entry mirror and an exit mirror, and within which there is positioned an element of active material designed to be pumped optically, and a pump system designed to produce a pump beam which is polarized and which presents a profile that is asymmetrical in the plane extending transversely to the propagation direction of the beam, the laser beam coming from the cavity being polarized, without implementing a polarizing element inside the cavity;

the solid state laser comprising an active material element designed to be pumped optically, said active element is a glass or a crystal co-doped with ions of ytterbium and erbium;

the solid state laser enables a first longitudinal monomode and transverse monomode laser beam to be emitted;

the power of the first laser beam is greater than or equal to 50 mW;

the wavelength ($\lambda$1) of the first laser beam is stabilized around 1.56 µm;

the absorber chemical element is selected from the group: rubidium, potassium, cesium, hydrogen, sodium, lithium.

* * * * *

UNITED STATES PATENT AND TRADEMARK OFFICE
CERTIFICATE OF CORRECTION

PATENT NO. : 7,233,608 B2  Page 1 of 1
APPLICATION NO. : 10/481177
DATED : June 19, 2007
INVENTOR(S) : Jaouad Zemmouri et al.

It is certified that error appears in the above-identified patent and that said Letters Patent is hereby corrected as shown below:

On the Title Page Item (75) Inventors, second line, "Faches-Thumesnti" should read --Faches-Thumesnil--;

On the Title page Item (75) Inventors, third line, "Mons-en-Baroeul" should read --Mons-En-Baroeul--; and Column 2, after line 45, insert the heading --BRIEF SUMMARY OF THE INVENTION--.

Signed and Sealed this

Twenty Second Day of April, 2008

JON W. DUDAS
*Director of the United States Patent and Trademark Office*